United States Patent

Kronies et al.

[15] 3,671,940

[45] June 20, 1972

[54] TEST APPARATUS FOR DIGITAL COMPUTER

[72] Inventors: Reinhard K. Kronies, Glendora; Iver C. Hansen, Arcadia, both of Calif.

[73] Assignee: Burroughs Corporation, Detroit, Mich.

[22] Filed: March 19, 1970

[21] Appl. No.: 21,044

[52] U.S. Cl. ....... 340/172.5
[51] Int. Cl. ....... G06f 11/00
[58] Field of Search ....... 340/172.5

[56] References Cited

UNITED STATES PATENTS

| | | | |
|---|---|---|---|
| 3,311,890 | 3/1967 | Waaben | 340/172.5 |
| 3,387,276 | 6/1968 | Reichow | 340/172.5 |
| 3,409,877 | 11/1968 | Alterman et al. | 340/172.5 |
| 3,493,343 | 4/1969 | Stahle | 340/172.5 |
| 3,439,347 | 4/1969 | Goshorn et al. | 340/172.5 |
| 3,336,579 | 8/1967 | Heymann | 340/172.5 |

*Primary Examiner*—Harvey E. Springborn
*Attorney*—Christie, Parker & Hale

[57] ABSTRACT

There is described an apparatus for monitoring the contents of any selected location in the main memory of a computer. The contents of an addressed location in memory is read out periodically and compared with the prior contents of the same memory location. On sensing a change in the contents of the memory location, operation of the computer is halted.

6 Claims, 2 Drawing Figures

INVENTORS.
REINHARD K. KRONIES
IVER C. HANSEN
BY
Christie, Parker & Hale
ATTORNEYS

TEST APPARATUS FOR DIGITAL COMPUTER

FIELD OF THE INVENTION

This invention relates to digital computers, and more particularly, is concerned with apparatus for testing the operation of a digital computer system.

BACKGROUND OF THE INVENTION

In debugging of both hardware and software of a high-speed digital computer, it is usual during a debugging operation to run a test program which includes a number of halt commands which stop the operation of the computer at selected points in the test program. With the computer halted, the condition of the various registers in the computer processor can be checked to determine if any errors or departures from predicted operation have occurred. While the status of wired registers can be handled this way, it is more difficult to determine what has happended to the contents of the memory by any direct measurement of the memory contents. It is particularly desirable to provide some means of determining how words in memory are being changed by a program, both in debugging a program and running a program.

In the past, the information in a particular location in memory could be examined by designing the program to read the information out of the core memory into a register before executing a Halt command, so that the information could be readily examined. To do this required program modification and processor time. In addition, in debugging a program, it may be helpful to determine if and when the contents of a particular location in memory gets changed during the execution of the program. The use of the Halt command, even if preceded by the reading out of the word in a particular location in memory to a register in the processor or in some form that can be more easily tested than the memory core, is not always practical. For example, in any iterative program routine, the contents of a particular memory location may be modified only after the routine has been repeated a number of times. In such case, the Halt command inserted in the iterative routine would stop the processor a number of times before the testing of the memory location was actually needed.

SUMMARY OF THE INVENTION

The present invention provides a simple test apparatus by which any selected location in memory can be monitored while a program is being run in the computer. With no modification to the program, the apparatus of the present invention permits a selected cell location to be examined periodically without interferring with the running of a program on the computer. If any change takes place in the word in the particular memory location, either by operation of the program or through some malfunction, execution of the program is halted, permitting the debugging analysis to be made.

BRIEF DESCRIPTION OF THE DRAWINGS

For a better understanding of the invention reference should be made to the accompanying drawings wherein.

DETAILED DESCRIPTION

Figure 1:
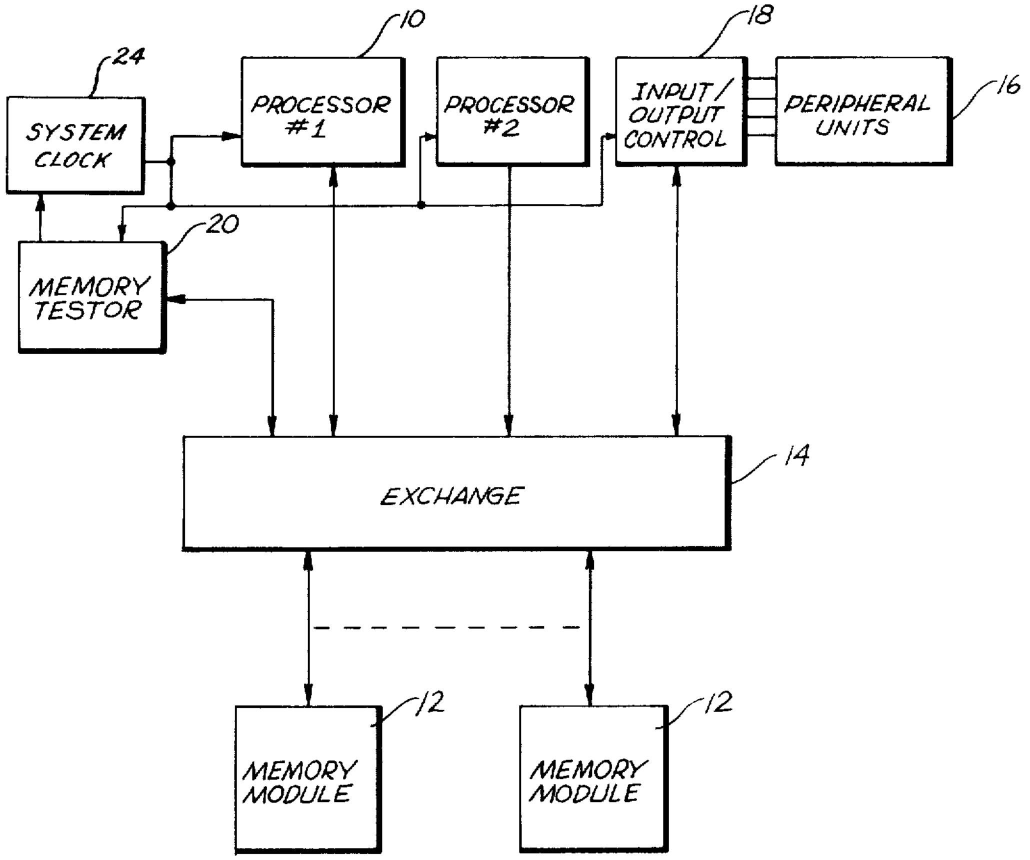
FIG. 1 is a block diagram of a digital computing system incorporating the present invention.

Referring to FIG. 1 in detail, there is shown in schematic form, a typical digital computing system, in which one or more digital processors 10 for performing various arithmetical and logical functions communicate with any one of a plurality of memory modules 12 through an exchange 14. Various peripheral units, indicated at 16, also communicate with the memory modules 12 through the exchange 14 by means of an input-output control 18. Such an arrangement is described, for example, in U.S. Pat. No. 3,200,380. A memory tester 20, incorporating the features of the present invention, also communicates with any of the memory modules 12 through the exchange 14 in the same manner as the processors and input-output control. As used throughout the specification and claims, the words "cell" and "memory location" are used interchangeably to refer to a single addressable unit of data stored in memory, the unit of data being referred to as a "data word" or "word."

Figure 2:
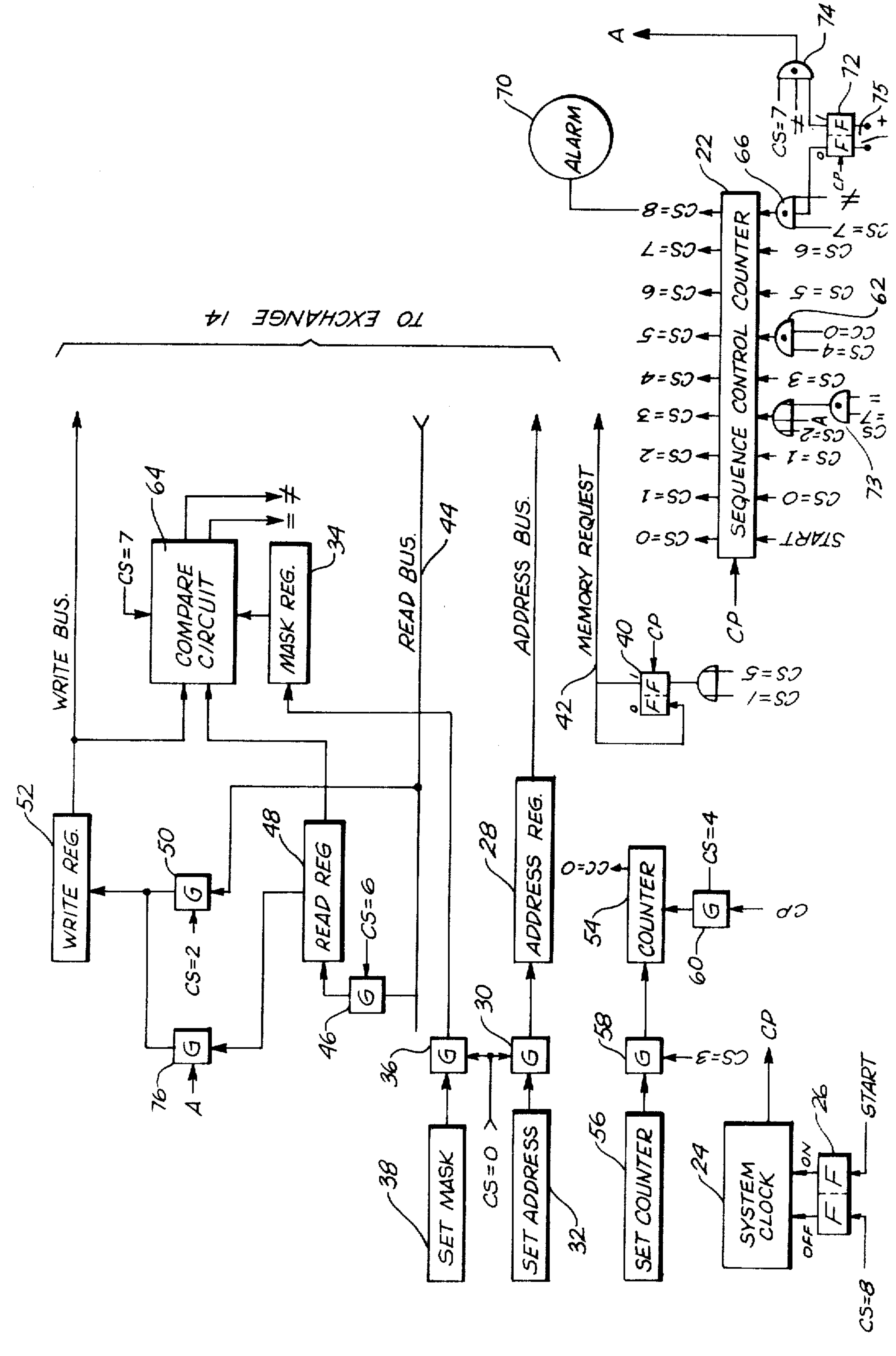
FIG. 2 is a schematic block diagram of a preferred embodiment of the invention.

Referring to FIG. 2, there is shown in detail the portion of the memory tester 20 by means of which, according to the present invention, any selected cell or address location in any of the memory modules 12 can be continuously monitored. Operation of the monitoring circuit of FIG. 2 is under control of a sequence control counter 22 which is synchronized with clock pulses derived from a system clock 24. The system clock is controlled by a flip-flop 26 which is initially turned on when the computer system is placed in operating condition. The system clock 24 provides clock pulses throughout the entire computer system. The sequence counter 22 provides a plurality of control states designated $CS = 0$ through $CS = 8$. It is set initially to the $CS = 0$ state when the monitoring operation is started.

During the $CS = 0$ state, an address is set into an address register 28 through a gate 30 from an address source 32. The address source 32 may, for example, be a set of manually-operated toggle switches by which any binary coded address may be established. Alternatively, the address of the selected cell in memory which is to be monitored may be derived programmatically from memory or from one of the processors. The address in the address register is applied to an address bus which goes to the address register of the addressed memory module 12 through the exchange 14.

Also, in addition to loading the address register 28 during the $CS = 0$ state, a Mask register 34 may be also loaded through a gate 36 from a Set Mask source 38. The function of the Mask register, as will hereinafter be more fully described, is to permit monitoring on any selected portion of a memory cell. The setting of the Mask register determines which bits in a word stored in the address cell are to be used during the monitoring operation. The The source 38 of the mask information again may be either a set of manually-operated switches or may be from one of the processors or memory.

The next clock pulse sets the sequence counter 22 to the $CS = 1$ state. The $CS = 1$ state is applied to one input of a control flip-flop 40, which is a conventional flip-flop that has two stable states, referred to as the 0 and 1 states. The flip-flop 40 is set to either state with the next input clock pulse CP if a positive input level is applied to the corresponding one of two control inputs. The control flip-flop 40 is set to the 1 state by the $CS = 1$ state with the next CP for initiating a memory request level on a line 42. The line 42 goes to the selected memory module through the exchange 14 to initiate a memory cycle on the addressed memory cell. The line 42 is also connected to the other input of the control flip-flop 40 so that The control flip-flop 40 is re-set to the 0 state with the next clock pulse which also sets the sequence control counter 22 to the $CS = 2$ state.

The memory cycle initiated in the particular memory module causes the contents of the selected cell to be applied to a Read bus 44. During the $CS = 2$ state, a gate 50 couples the Read bus 44 to a Write register 52. Thus the register 52 is loaded with the word from the addressed memory cell. The next clock pulse advances the sequence control counter 22 to the $CS = 3$ state. It is assumed that the memory speed is such that the information is placed on the Read bus in response to the Memory Request signal on the line 42 within one clock interval, i.e., during the $CS = 2$ state of the sequence control counter. It will be apparent to those skilled in the art that if a slower speed memory is used, the sequence control counter may be delayed for additional clock intervals before advancing to the $CS = 3$ state to permit the Write register 52 time to receive the word from the memory. The timing of a sequence control unit to operate with memories of different speeds is described, for example, in U.S. Pat. No. 3,339,183 in which a sequence control unit in a processor operates to read out information from either a high-speed thin film memory or a lower-speed core memory.

During the $CS = 3$ state, a time-out counter 54 is set to a predetermined count condition from a Set Counter source 56 through a gate 58. The source 56 may be a manually-set binary coded value or may be a programmatically defined binary value derived from the processor or from main memory. The setting of the counter determines the number of clock pulse intervals provided between successive samplings of the monitored memory cell. By way of example only, the counter may be designed to have a maximum count capacity of 128. The counter 54 is arranged to be set to count any amount less than that by setting the counter by the source 56 to any selected count condition and then counting it down to zero by clock pulses. This is done during the $CS = 4$ state of the sequence counter 22 by means of a gate 60 which passes clock pulses to the countdown input of the counter 54. When the counter is counted down to 0, it provides an output signal on the $CC = 0$ line from the counter 54. This is sensed by a logical AND circuit 62 together with the $CS = 4$ state. The output of the AND circuit 62, when both inputs are true, sets the sequence control counter 22 to the $CS = 5$ state.

During the $CS = 5$ state, the control flip-flop 40 is turned on, initiating another memory request on the memory request line 42. The sequence control counter 22 then advances to the $CS = 6$ state with the next clock pulse. During the $CS = 6$ state, the contents of the memory cell, read out of memory in response to the memory request signal, appears on the Read bus 44 and is coupled to the Read register 48 through a gate 46. The sequence control counter 22 then advances to the $CS = 7$ state.

During the $CS = 7$ state, a Compare circuit 64 compares the contents of the memory cell originally placed in the Write register 52 with the contents of the memory cell as placed in the Read register 48. The Compare circuit 64, in response to the contents of the Mask register 34, makes the comparison for an equal (=) or unequal ( ≠ ) condition on only those bits of the word indicated by the contents of the Mask register. The Compare circuit has two outputs designated = and ≠ . If the contents of the two registers 52 and 48 are ≠ , sequence control counter 22 is set to the $CS = 8$ state by the output of a logical AND circuit 66. The AND circuit 66 senses that the sequence counter is in the $CS = 7$ state, the output of the Compare circuit 64 indicates a ≠ condition, and that a control flip-flop 72 is off. The $CS = 8$ state of the sequence control counter may be used to activate an alarm 70, for example, and may be also applied to the control flip-flop 26 to turn off the system clock 24, thereby halting operation of the computer system. With the computer system halted, the operator can then examine the contents of the Read register 48 to analyze the operation of the computer or take other appropriate action as desired. The advantage of this arrangement over the prior art disclosed in the introduction comes about because the normal program may be executed by the data processor without modification to the program and the memory tester will, automatically and independently from the processor, read out the content of the desired memory location and store it in Read register 48 for testing. Thus the need for modification of the normal program being debugged is eliminated. Also the normal program being executed by the data processor, using the present invention,is only interrupted when the content of the location in memory (read and stored in Read register 48) differs from what it is supposed to be whereas in the prior art the normal program is interrupted each time it is desired to check the memory location. Additionally the content of the memory location under test is ,automatically made available in Read register 48 by the memory tester again without the need for the data processor to execute a special instruction to obtain it from memory.

If the Compare circuit 64, during the $CS = 7$ state, indicates that the contents of the monitored memory cell have not changed, i.e., the contents of the registers 48 and 52 are =, the sequence control counter 22 is returned to the $CS = 3$ state. This is accomplished by the output of a logical AND circuit 73 which senses the $CS = 7$ state and the = state of the Compare circuit 64. This causes the counter 54 to be re-set and, after the predetermined delay, causes the contents of the monitored memory cell to be again read into the Read register 48 and a new comparison made. Thus as long as the contents of the monitored memory cell remain unchanged, the monitoring circuit continues to recycle and a new comparison is made on the memory location after a delay determined by the condition of the Set Counter source 56, until the operation of the monitoring circuit is stopped by the operator or the memory cell condition changes.

It may be desirable to halt operation of the computer only after a longer interval of time than that provided by the counter 54. To this end, the control flip-flop 72 is provided which is normally in the Off condition, corresponding to the normal operation of the monitoring circuit as described above. The 0 level from the flip-flop 72 is applied to the AND circuit 66, so that the sequence control counter 22 can only be set to the $CS = 8$ state if the control flip-flop 72 is off. If the control flip-flop 72 is turned on as by manual control switch 75, a logical AND circuit 74, which also senses the $CS = 7$ and the ≠ condition of the Compare circuit 64, provides a true level on an output at A. This output from the AND circuit 74 is applied to the sequence control counter 22 to re-set it to the $CS = 3$ state, thus causing the monitoring circuit to cycle through another readout operation. At the same time, the word in the Read register 48 is transferred to the Write register 52 through a gate 76, thereby updating the word on which the next comparison is made. The propagation time through AND gate 74 and the gate 76 as well as the time for the compare circuit 64 to stabilize are sufficiently fast to allow the signal from these circuits to stabilize by the time the clock pulse occurs which stores the word from register 48 into register 52. At some indefinite time determined by the operator, the control flip-flop 72 can then be reset to 0 and the processor is then halted if a further change occurs to the contents of the memory location.

What is claimed is:

1. In a computer system in which a data processor is operable for executing a program to transmit data words to and receive data words from memory locations in an addressable memory, apparatus for monitoring a data word in any selected memory location for changes made by the processor, said apparatus comprising means including an interval timer for repeatedly reading out the data word from the same selected location in memory at timed intervals controlled by said interval timer, means storing the data word initially read out of memory from said selected location by the reading out means, means comparing the data word from the same memory location each time it is subsequently read out of memory from said location with the data word in said storing means, and means responsive to the comparing means for signaling whenever the data word read out is not equal to the data word in said storing means.

2. Apparatus as defined in claim 1 further including means responsive to said comparing means for halting the operation of the data processor whenever the data word read out of memory is not equal to the word in the storing means.

3. Apparatus as defined in claim 1, further comprising means including a mask register for limiting comparison by the comparison means to preselected portions of the data words being compared by the comparing means.

4. Apparatus for testing the contents of a storage location in the main memory of a digital computer comprising register means for storing the address of a selected location in memory, a first storage register, means responsive to the address in the address register for initially reading out the contents of the addressed location in memory into the first register, a second register, timing means, means responsive to the contents of the address register and the timing means for periodically reading out the contents of the addressed location in memory into the second register at time intervals controlled by said timing means, comparing means coupled to the first and second registers for providing an output signal that signals when the contents of the two registers are not identical, and control means responsive to the output signal from the comparing means for halting the operation of said means reading out the contents of the addressed location in memory into the second register and indicating that the contents of the two registers are not identical.

5. Apparatus as defined in claim 4 further including a mask register for indicating which portions of the contents of the two registers are to be compared, and means controlled by the mask register for limiting the portions of the contents of the first and second registers coupled to the compare means.

6. In a data processing system having an addressable memory, apparatus for monitoring any selected address location in the memory to determine when data stored at the location is changed, comprising an address register, first and second data registers, comparison means coupled to the first and second registers, the comparison means providing an output signal for indicating when the data in the first and second registers are not equal, first means for initiating the transfer of data stored in memory from the address location in memory specified by the address register to the first data register, second means including a variable settable interval timer for initiating the transfer of data repeatedly, at intervals fixed by the setting of said interval timer, from the same address location in memory specified by the address register to the second data register, means activating the first means and second means in sequence, and means responsive to the signal from the comparison means for terminating the repetitive operation of the second means when the comparison means output signal indicates the contents of the first and second registers are not equal.

* * * * *